(12) United States Patent
Takahashi et al.

(10) Patent No.: US 11,560,698 B2
(45) Date of Patent: Jan. 24, 2023

(54) STATE ANALYSIS DEVICE, STATE ANALYSIS METHOD, AND RECORDING MEDIUM

(71) Applicant: NEC CORPORATION, Tokyo (JP)

(72) Inventors: Masatake Takahashi, Tokyo (JP); Manabu Kusumoto, Tokyo (JP); Jun Sakai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 357 days.

(21) Appl. No.: 16/636,982

(22) PCT Filed: Aug. 2, 2018

(86) PCT No.: PCT/JP2018/028972
§ 371 (c)(1),
(2) Date: Feb. 6, 2020

(87) PCT Pub. No.: WO2019/031371
PCT Pub. Date: Feb. 14, 2019

(65) Prior Publication Data
US 2020/0370285 A1    Nov. 26, 2020

(30) Foreign Application Priority Data
Aug. 7, 2017 (JP) .............................. JP2017-152613

(51) Int. Cl.
*E03B 7/07* (2006.01)
(52) U.S. Cl.
CPC .............. *E03B 7/078* (2013.01); *E03B 7/072* (2013.01)
(58) Field of Classification Search
CPC .......... E03B 7/078; E03B 7/072; G01M 3/00; G01M 4/24

USPC ...................................................... 702/47, 51
See application file for complete search history.

(56) References Cited

U.S. PATENT DOCUMENTS

| 5,355,324 A | 10/1994 | Zhang | |
|---|---|---|---|
| 2015/0308919 A1* | 10/2015 | Zhang | G01M 3/243 702/51 |

FOREIGN PATENT DOCUMENTS

| JP | 2003-269683 A | | 9/2003 |
| JP | 2010-230418 A | | 10/2010 |
| JP | 2017002554 | * | 1/2017 |
| WO | 2015/146109 A1 | | 10/2015 |
| WO | 2017/078004 A1 | | 5/2017 |

OTHER PUBLICATIONS

JP2017002554 English translation (Year: 2017).*
Written Opinion for PCT/JP2018/028972, dated Nov. 6, 2018.
International Search Report for PCT/JP2018/028972, dated Nov. 6, 2018.

(Continued)

*Primary Examiner* — Michael P Nghiem
*Assistant Examiner* — Dacthang P Ngo
(74) *Attorney, Agent, or Firm* — Sughrue Mion, PLLC

(57) ABSTRACT

A state analysis device is capable of determining a state of the interior of piping with high precision, and includes: an index calculation means for deriving an index indicating the state of the piping, based on a flow speed of fluid flowing out of the piping, and a fluid pressure of the interior of the piping at two or more locations of the piping; and a determination means for determining the state of the piping, based on the index.

11 Claims, 9 Drawing Sheets

(56) References Cited

OTHER PUBLICATIONS

Delgado-Aguinaga et al., "Varying-parameter modeling and Extended Kalman Filtering for reliable leak diagnosis under temperature variations", 2016 20th International Conference on System Theory, Control and Computing (ICSTCC), 2016, pp. 632-637.
Tian et al., "A study on a real-time leak detection method for pressurized liquid refrigerant pipeline based on pressure and flow rate", Applied Thermal Engineering, vol. 95, 2015, pp. 462-470.
Communication dated Sep. 2, 2020 by the European Patent Office in application No. 18845015.9.

* cited by examiner

| RANKING | PIPING | INDEX |
|---|---|---|
| 1 | 11-C | 0.541 |
| 2 | 38-D-1 | 0.523 |
| 3 | 25-F-4 | 0.508 |
| 4 | 14-E | 0.497 |
| 5 | 119-1 | 0.489 |

# STATE ANALYSIS DEVICE, STATE ANALYSIS METHOD, AND RECORDING MEDIUM

CROSS REFERENCE TO RELATED APPLICATIONS

This application is a National Stage of International Application No. PCT/JP2018/028972 filed Aug. 2, 2018, claiming priority based on Japanese Patent Application No. 2017-152613 filed Aug. 7, 2017, the disclosure of which is incorporated herein in its entirety by reference.

TECHNICAL FIELD

The present invention relates to a state analysis device, a state analysis method, and a recording medium.

BACKGROUND ART

Prediction on a deterioration status of piping constituting a water and sewage network, a pipeline, and the like has been performed in an aspect of preventive maintenance. When the deterioration status is predicted, for example, renewal and the like of the piping are performed based on a prediction result.

PTL 1 describes a conduit deterioration diagnostic facility and the like. The conduit deterioration diagnostic facility described in PTL 1 diagnoses deterioration of a conduit whose interior is filled with liquid by using a shock wave.

CITATION LIST

Patent Literature

[PTL 1] Japanese Unexamined Patent Application Publication No. 2010-230418

SUMMARY OF INVENTION

Technical Problem

When renewal of piping is performed based on prediction on deterioration, it may be difficult to handle unexpected local and drastic deterioration, piping for which renewal is unnecessary may be replaced by predicting that deterioration progresses as compared with actual deterioration, or the like. Specifically, there is a demand for a technique of estimating an internal state of the piping with high precision, as compared with the technique described in PTL 1, and the like.

In order to solve the above-described issue, a main object of the present invention is to provide a state analysis device and the like capable of determining a state of the interior of piping with high precision.

Solution to Problem

A state analysis device according to one aspect of the present invention includes: index calculation means for calculating, based on a flow speed of fluid flowing out of piping, and a pressure of the fluid inside the piping at two or more locations of the piping, an index indicating a state of the piping; and determination means for determining the state of the piping based on the index.

Further, a state analysis method according to one aspect of the present invention includes: calculating, based on a flow speed of fluid flowing out of piping, and a pressure of the fluid inside the piping at two or more locations of the piping, an index indicating a state of the piping; and determining the state of the piping based on the index.

Furthermore, a recording medium according to one aspect of the present invention records a program causing a computer to execute: processing of calculating, based on a flow speed of fluid flowing out of piping, and a pressure of the fluid inside the piping at two or more locations of the piping, an index indicating a state of the piping; and processing of determining the state of the piping based on the index.

Advantageous Effects of Invention

The present invention is able to provide a state analysis device and the like capable of determining a state of the interior of piping with high precision.

EXAMPLE EMBODIMENT

Figure 16:
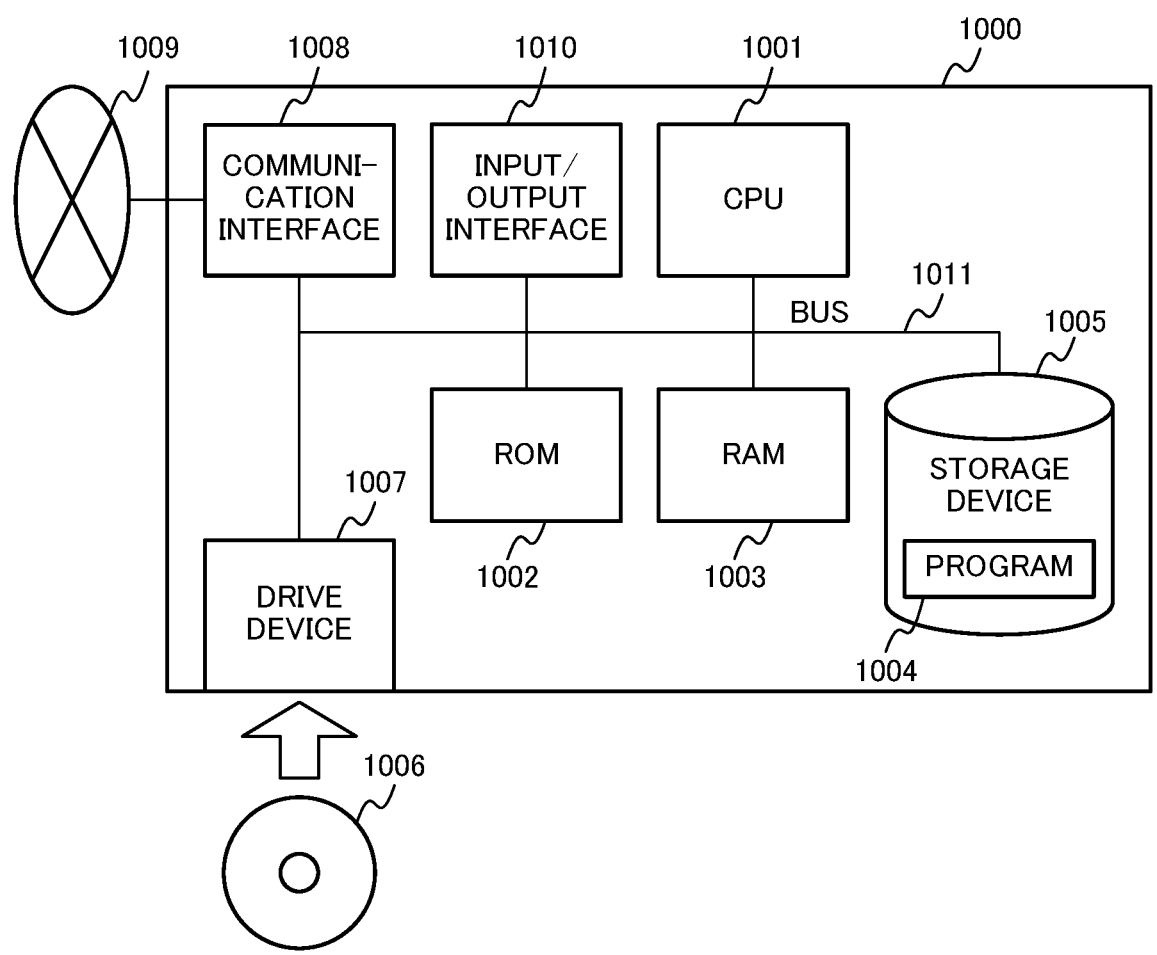
FIG. 16 is a diagram illustrating one example of an information processing device for achieving the state analysis device and the like according to each of the example embodiments of the present invention.

Example embodiments according to the present invention are described with reference to accompanying drawings. In each of the example embodiments according to the present invention, each constituent element of each device is indicated by a block being a function unit. A part or all of each constituent element of each device is achieved by any combination of an information processing device 1000 illustrated in FIG. 16, and a program, for example. The information processing device 1000 includes the following configuration, as one example.

A central processing unit (CPU) 1001
A read only memory (ROM) 1002
A random access memory (RAM) 1003
A program 1004 to be loaded on the RAM 1003
A storage device 1005 for storing the program 1004
A drive device 1007 for reading and writing with respect to a recording medium 1006
A communication interface 1008 to be connected to a communication network 1009
An input/output interface 1010 for inputting and outputting data
A bus 1011 for connecting the constituent elements Each of the constituent elements of each of the devices in each of the example embodiments is achieved by causing the CPU 1001 to acquire and execute the program 1004 for achieving these functions. The program 1004 for achieving a function of each of the constituent elements of each of the devices is, for example, stored in advance in the storage device 1005 or the RAM 1003, and the CPU 1001 reads the program 1004 as necessary. Note that the program 1004 may be supplied to the CPU 1001 via the communication network 1009; or may be stored in advance in the recording medium 1006, and the program may be read, and supplied to the CPU 1001 by the drive device 1007.

Various modification examples are available as a method of achieving each of the devices. For example, each of the devices may be achieved by any combination of each individual information processing device 1000 and the program for each of the constituent elements. Alternatively, a plurality of constituent elements included in each of the devices may be achieved by any combination of one information processing device 1000 and the program.

Further, a part or all of each of the constituent elements of each of the devices is achieved by a general-purpose or dedicated circuitry including a processor and the like, or combination of these. These may be constituted by a single chip, or may be constituted by a plurality of chips to be connected via a bus. A part or all of each of the constituent elements of each of the devices may be achieved by combination of the above-described circuitry or the like, and the program.

When a part or all of each of the constituent elements of each of the devices is achieved by a plurality of information processing devices, a circuitry, or the like, the plurality of the information processing devices, the circuitry, or the like may be concentratedly disposed or may be distributively disposed. For example, an information processing device, a circuitry, or the like may be achieved as an embodiment in which each of a client-and-server system, a cloud computing system, and the like is connected via a communication network.

Note that, in each of the following example embodiments, it is assumed that piping is piping constituting a water network, and fluid in an interior of the piping is water. However, a state analysis device according to each of the example embodiments may employ another piping as an analysis target.

First Example Embodiment

Figure 1:
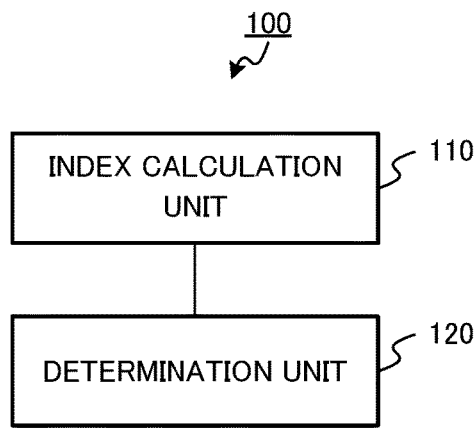
FIG. 1 is a diagram illustrating a configuration of a state analysis device according to a first example embodiment of the present invention.

First, a first example embodiment according to the present invention is described. FIG. 1 is a diagram illustrating a state analysis device according to the first example embodiment of the present invention.

As illustrated in FIG. 1, a state analysis device 100 according to the first example embodiment of the present invention includes an index calculation unit 110 (one example of an index calculation means) and a determination unit 120 (one example of a determination means). The index calculation unit 110 calculates an index relating to a state of piping or fluid, based on a flow speed of fluid flowing out of the piping, and a pressure of the fluid inside the piping at two or more locations of the piping. The determination unit 120 determines a state of the piping, based on the index.

Figure 2:
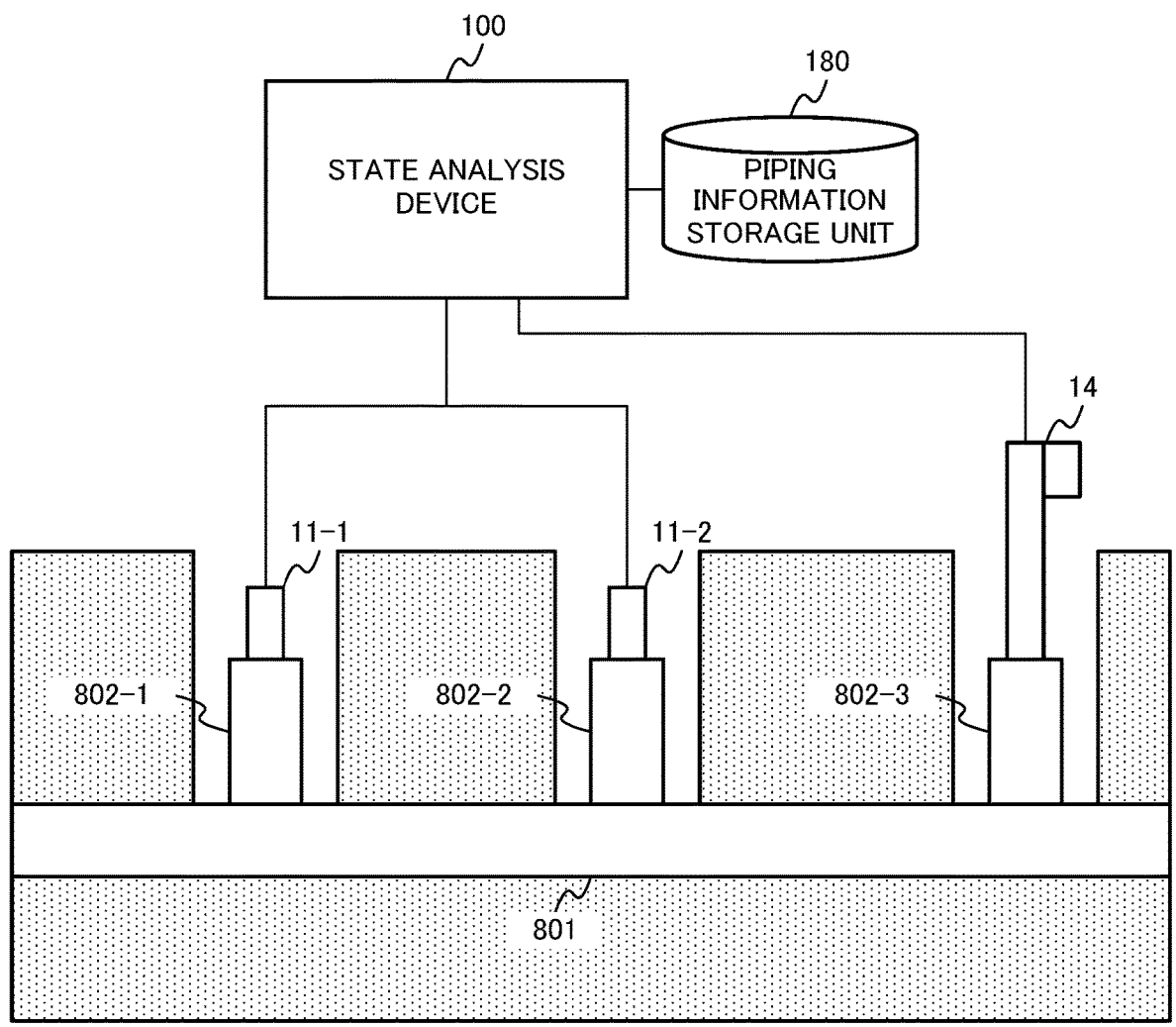
FIG. 2 is a diagram illustrating a configuration example, when a state of piping of a water network is determined by the state analysis device according to the first example embodiment of the present invention.

Note that, as illustrated in FIG. 2 to be described in the following, the state analysis device 100 may include a piping information storage unit 180. The piping information storage unit 180 stores, for example, information relating to piping such as a diameter and a length of piping being an analysis target. Further, the piping information storage unit 180 may store information relating to another piping required for analysis. The state analysis device 100 and the piping information storage unit 180 are connected to each other via a bus or a communication network.

FIG. 2 illustrates one example of a configuration of the state analysis device 100 when piping analysis is performed. The state analysis device 100 is connected to pressure detection units 11-1 and 11-2, and a pseudo leakage control unit 14. The pressure detection units 11-1 and 11-2, and the pseudo leakage control unit 14 are respectively mounted on valve stopper units 802-1 to 802-3 being connected to piping 801. Note that the valve stopper unit 802 is, for example, a valve or a stopper to be connected to the piping 801, such as a fireplug, an air valve, or a shutoff valve.

Each of the pressure detection units 11-1 and 11-2 acquires pressure data of fluid of the interior of the piping. In the example illustrated in FIG. 2, the pressure detection unit 11 detects a fluid pressure in the vicinity of the mounted valve stopper unit 802.

Figure 3:
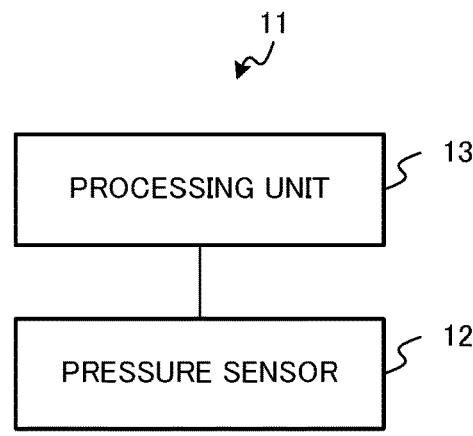
FIG. 3 is a diagram illustrating a configuration example of a pressure detection unit to be connected to the state analysis device.

FIG. 3 illustrates one example of a configuration of the pressure detection unit 11. As illustrated in FIG. 3, the pressure detection unit 11 includes a pressure sensor 12 and a processing unit 13. The pressure sensor 12 detects a pressure of the interior of the piping. As the pressure sensor 12, for example, a semiconductor sensor is employed. However, a sensor of another type may be employed, as the pressure sensor 12, and a type does not matter.

The processing unit 13 performs processing with respect to pressure data detected by the pressure sensor 12. The processing unit 13 is constituted by a processor for performing signal processing and the like, a memory, a communication mechanism for performing data transmission and reception, and the like. However, a specific configuration of the processing unit 13 is not specifically limited. Further, a type of processing to be performed by the processing unit 13 is not specifically limited. For example, the processing unit 13 performs data processing and the like in such a way that pressure data detected by the pressure sensor 12 have a format easily usable in each of constituent elements of the state analysis device 100.

Further, the pseudo leakage control unit 14 controls fluid outflow from the piping 801. In the following, fluid outflow from the piping 801 indicates release from the interior of the piping 801 to the exterior of the piping 801 including a ground and the like. The pseudo leakage control unit 14 controls the presence or absence of fluid outflow, and an amount of outflow by controlling opening and closing of a valve stopper or the like provided in the valve stopper unit 802. Specifically, fluid leakage from the piping is artificially reproduced by the pseudo leakage control unit 14.

Note that, in the example illustrated in FIG. 2, the state analysis device 100 is connected to two pressure detection units 11. Alternatively, the state analysis device 100 may be connected to three or more pressure detection units 11.

Subsequently, each of the constituent elements of the state analysis device 100 according to the present example embodiment is described.

The index calculation unit 110 calculates an index relating to a state of piping, based on a flow speed of fluid flowing out of the piping, and a fluid pressure of the interior of the piping at two or more locations of the piping.

As one example, the index calculation unit 110 calculates an index relating to a state of piping, based on a fluid pressure at a plurality of locations when fluid does not flow out of the piping, a fluid pressure at a plurality of locations when fluid flows out of the piping, and a flow speed of the fluid flowing out of the piping. For calculating an index relating to a state of piping, a fluid pressure and a flow speed of fluid in a case that an amount of fluid flowing out per unit time has two or more different values are used. Further, it is only necessary to acquire a fluid pressure at least two locations, as the plurality of locations.

In a case that a fluid pressure when fluid flows out of the piping is detected by the pressure detection unit 11, an amount of the fluid such as water flowing out of the piping is controlled by the above-described pseudo leakage control unit 14 or the like. Note that the amount of fluid flowing out of the piping may be controlled by another procedure. For example, the amount of fluid flowing out of the piping may be controlled by artificially controlling a valve stopper or the like provided in the valve stopper unit 802.

Further, in a case that a fluid pressure when the fluid flows out of the piping is detected by the pressure detection unit 11, an amount of the fluid such as water flowing out of the piping may be fixed, or may be changed during a period when the pressure is detected. When the amount of fluid flowing out of the piping is fixed, the amount of the fluid flowing out of the piping is determined as necessary depending on a type of the piping, an assumed state of the piping, or the like. An example of a case that the amount of fluid flowing out of the piping is changed is described later.

The index calculation unit 110 calculates a value of an index indicating a state of piping, based on a relationship among a fluid pressure of the interior of the piping, a flow speed of fluid flowing out of the piping, and a friction between an inner surface of the piping and the fluid. For example, the index calculation unit 110 calculates, as an index indicating a state of piping, a coefficient indicating a friction between an interior surface of the piping 801 and fluid such as water, and a flow speed of the fluid of the interior of the piping.

A relationship expressed by the following equation (1) is established regarding energy of fluid of the interior of piping. The equation (1) is calculated by using the Bernoulli's theory. The index calculation unit 110 calculates an index indicating a state of piping, based on the relationship expressed by the equation (1), as one example.

[Equation 1]

$$\frac{\rho v_1^2}{2} + \rho g z + p_1 = \frac{\rho v_2^2}{2} + \rho g z + p_2 + \rho g f \frac{L}{D} \frac{v_2^2}{2g} \quad (1)$$

In the equation (1), $\rho$ denotes a density of fluid of the interior of the piping, g denotes a gravitational acceleration, and z denotes a location of the piping. v1 and v2 respectively denote flow speeds of fluid flowing through the piping 801 at locations where the valve stopper units 802-1 and 802-2 at which the pressure detection units 11-1 and 11-2 are mounted are provided. p1 and p2 respectively denote fluid pressures to be detected by the pressure detection units 11-1 and 11-2. f denotes a frictional coefficient indicating a friction between an interior surface of the piping 801 and fluid such as water, L denotes a length of the piping, and D denotes a diameter of the piping, respectively.

In a branchless piping 801, it can be regarded that v1 and v2 are equal. In view of this, it is regarded that v1 and v2 are equal with respect to the equation (1). Further, it is assumed that a flow speed of fluid in the piping 801 when the fluid does not flow out of the piping 801 is V0, and a flow speed of the fluid when the fluid flows out of the piping 801 is V1. When V0 and V1 are used, a flow speed of fluid of the interior of the piping when the fluid flows out is indicated as V0+V1. Further, it is assumed that fluid pressures to be detected by the pressure detection units 11-1 and 11-2 when pseudo leakage does not occur are respectively P10 and P20. It is assumed that fluid pressures to be detected by the pressure detection units 11-1 and 11-2 when pseudo leakage is caused to occur are respectively P1 and P2. In this case, the following equation (2) is calculated from the equation (1).

[Equation 2]

$$\frac{A(V_1)}{B} = V_1^2 + 2V_0 V_1 \quad (2)$$

In the equation (2), A and B are respectively expressed by the following equations (3) and (4).

[Equation 3]

$$A = \frac{P_1 - P_2}{\rho g} - \frac{P_{10} - P_{20}}{\rho g} \quad (3)$$

[Equation 4]

$$B = f \frac{L}{D} \frac{1}{2g} \quad (4)$$

Specifically, the equation (2) becomes a function in which V1 is a variable.

In each of the equations (2) to (4), P10, P20, P1, and P2 are detected by, for example, the pressure detection units 11-1 and 11-2. V1 is calculated, based on a flow rate of fluid flowing out per unit time, and a cross-sectional area of the piping. In other words, by dividing an amount of fluid flowing out per unit time by a cross-sectional area of the piping 801, V1 being a flow speed is calculated. Further, L being a length of the piping, and D being a diameter of the piping are calculated by, for example, referring to information stored in the piping information storage unit 180, or the like. Therefore, in each of the equations (2) to (4), unknown parameters become the frictional coefficient f and the flow speed V0. These parameters become an index indicating a state of the piping. As one example, the index calculation unit 110 calculates these parameters as an index indicating a state of the piping by using the equations (2) to (4).

A procedure of calculating the above-described parameters by the index calculation unit 110 is further described. When a flow rate of fluid flowing out of the valve stopper unit 802 or the like changes, V1, P10, and P20 change. By substituting V1, P10, and P20, which change according to a change in flow rate of flowing-out fluid, into equation (2), a plurality of equations in which the frictional coefficient f and the flow speed V0 remain as variables can be calculated. The index calculation unit 110 calculates the frictional coefficient f and the flow speed V0, based on equations calculated as described above.

For example, the index calculation unit 110 calculates the frictional coefficient f and the flow speed V0 by solving simultaneous equations relating to two equations calculated according to flow rates of two steps of fluid flowing out of the valve stopper unit 802 or the like.

Further, the index calculation unit 110 may calculate the frictional coefficient f and the flow speed V0, based on three or more equations respectively calculated according to flow rates of three steps or more of fluid flowing out of the valve stopper unit 802 or the like. Values of P10, P20, and the like calculated by the pressure detection units 11, or V1 being a flow speed of flowing-out fluid may include an error. By calculating the frictional coefficient f and the flow speed V0 based on three or more equations by the index calculation unit 110, it is possible to reduce an influence or the like of an error. The index calculation unit 110 may calculate the frictional coefficient f and the flow speed V0, based on fluid pressures calculated by three or more pressure detection units 11.

Note that the index calculation unit 110 may calculate an index relating to a state of piping, based on a method different from the method employing the above-described equations. For example, the index calculation unit 110 may calculate the above-described parameters and the like by using a model calculated in advance by an experiment, simulation, or the like.

The index calculation unit 110 may calculate a parameter different from the above-described parameters, as an index indicating a state of piping. For example, when piping being a target is old or the like, D being a diameter of the piping may be unclear. In such a case, the index calculation unit may calculate f/D, in place of the above-described frictional coefficient f. Specifically, the index calculation unit 110 may calculate a value equivalent to a value calculated by dividing the frictional coefficient f by D being the diameter of the piping. The value of f/D changes with a tendency similar to the frictional coefficient f. Further, when an index indicating a state of another piping is used in the determination unit 120 to be described later, a required index may be calculated.

Further, when a flow rate of fluid flowing out of the piping changes, the index calculation unit 110 may calculate an index indicating a state of the piping, based on a pressure detected by the pressure detection unit 11. Specifically, by controlling the pseudo leakage control unit 14 as necessary, a flow rate of fluid flowing out of the piping is changed. The pressure detection unit 11 detects a pressure during a period when the flow rate of fluid flowing out of the piping changes. The pressure in this case generally changes according to a change in flow rate. Further, the index calculation unit 110 calculates an index indicating a state of the piping, based on a pressure detected as described above.

When the piping being a state analysis target is a piping constituting a water network, a water consumption amount cyclically varies approximately in one day as a cycle. A water pressure of water flowing through the piping varies depending on variation of water consumption amount. When a variation of water consumption amount or pressure is great, an index indicating a state of the piping to be calculated by the index calculation unit 110 may be influenced by the variation.

Further, in a water network, a water pressure also varies by external disturbance or the like due to water consumption or the like. An index indicating a state of the piping to be calculated by the index calculation unit 110 is not only influenced by a cyclic variation of water consumption amount, but may be influenced by external disturbance. As a result of these, an error may occur in an analysis result by the determination unit 120 to be described later.

In view of the above, the index calculation unit 110 calculates an index indicating a state of the piping, based on a pressure detected, while intentionally varying a flow rate for flowing out of the piping. By performing as described above, when an analysis target is piping of a water network, for example, it is possible to reduce an influence of external disturbance or the like due to a cyclic variation, water consumption, or the like.

In this example, the index calculation unit 110 calculates an index indicating a state of the piping, for example, based on a component of a pressure that varies depending on a variation of flow rate for flowing out water or the like. The component of the pressure that varies depending on a variation of flow rate is calculated by determining detected pressure data in terms of a frequency, and extracting a component that matches with the amount for flowing out water.

When the pressure detection unit 11 detects a pressure, while varying a flow rate of water or the like flowing out of the piping, a variation of flow rate is performed at a cycle, which does not occur in general water consumption. For example, a variation of flow rate is performed in such a way that a flow rate of water or the like flowing out of the piping varies by using one minute as a cycle. By varying the amount of water flowing out of the piping at a cycle, which does not occur in general water consumption, an influence such as a variation of consumption amount due to general water consumption is reduced.

Further, the index calculation unit 110 may calculate an index indicating the above-described state of the piping, based on pressure data calculated by simulation or another method, in place of pressure data detected by the pressure detection unit 11. In this case, for example, the pressure data are calculated in advance by using a simulation model or the like, and stored in the piping information storage unit 180 or the like. Even when pressure data calculated by simulation or the like are used, the index calculation unit 110 calculates parameters by a procedure similar to the above-described procedure.

By using pressure data calculated by simulation or the like, even when the pressure detection unit 11 is not installed at a desired place, it becomes possible to calculate an index indicating the above-described state of the piping. Specifically, by using such data, even when the pressure detection unit 11 is not installed at a desired place, it becomes possible to determine a state of the piping.

The determination unit 120 determines a state of the piping, based on an index relating to the state of the piping or fluid, which is calculated by the index calculation unit 110.

As one example, the determination unit 120 determines a state of the piping, based on a friction between an interior surface of the piping 801, and fluid such as water. For example, the determination unit 120 determines a state of the piping by using the frictional coefficient f of the piping 801 calculated by the index calculation unit 110. More specifically, the determination unit 120 determines a state of the piping such as a degree of deterioration of the piping, based on a size of the frictional coefficient f.

A size of the frictional coefficient f changes by corrosion or aging of the piping. In piping in which a flowmeter is not installed, inserting a camera, digging out the piping, or the like is performed in order to calculate the frictional coefficient f. However, in terms of a cost, stable supply of water or the like via piping, and the like, generally, it is often the case that it is difficult to perform these operations.

On the other hand, in the state analysis device 100, the frictional coefficient f is calculated by the index calculation unit 110. Further, the determination unit 120 determines the state, based on the frictional coefficient f. By performing analysis as described above, it becomes possible to easily grasp the state of the piping.

The determination unit 120 determines the state of the piping, based on a size of the above-described index. Further, the determination unit 120 determines the state of the piping, based on a change in index. Specifically, the determination unit 120 determines the state of the piping, based on a size of the frictional coefficient f, or the change.

When analysis is performed based on a change in index indicating a state of the piping such as the above-described frictional coefficient f, for example, the determination unit 120 determines the state of the piping, based on a periodically calculated index. When an index such as the frictional coefficient f is periodically calculated, the index may be calculated at a fixed interval, or may be calculated at a different interval.

When the state of the piping is determined based on a change in index, the determination unit 120 determines the state of the piping by comparison between the calculated frictional coefficient f and a threshold value. The threshold value is determined, for example, based on a state of piping or the like, when an accident that a piping of a same type as the piping being an analysis target has burst has occurred in the past.

As comparison between an index indicating a state of the piping including the frictional coefficient f or the like, and the threshold value, the determination unit 120 determines the state based on whether the frictional coefficient f exceeds the threshold value, for example. When the frictional coefficient f has a large value exceeding the threshold value, the determination unit 120 determines that the piping is deteriorated.

Further, the determination unit 120 may determine the state of the piping, based on an aspect of change in index indicating the state of the piping. In other words, the determination unit 120 may use a value of the frictional coefficient f that has been calculated so far, and predict a time when the frictional coefficient f reaches the threshold value, based on a timewise change of the frictional coefficient f.

An aspect of an aging change of the index indicating a state of the piping is calculated by an experiment in advance or simulation. By using a timewise change of the frictional coefficient f, and an aspect of an aging change of the index indicating a state of the piping including the frictional coefficient f or the like, which is calculated by an experiment, simulation, or the like, a remaining life of the piping 801 being an analysis target is calculated. Therefore, by analysis by the determination unit 120, an appropriate replacement time or the like of the piping 801 is calculated. Further, when the frictional coefficient f drastically changes, as compared with general piping, the determination unit 120 may determine that a problem has occurred regarding a state of the piping. Specifically, the determination unit 120 calculates a tendency of a change in state of the piping 801 or the like.

Figure 4:
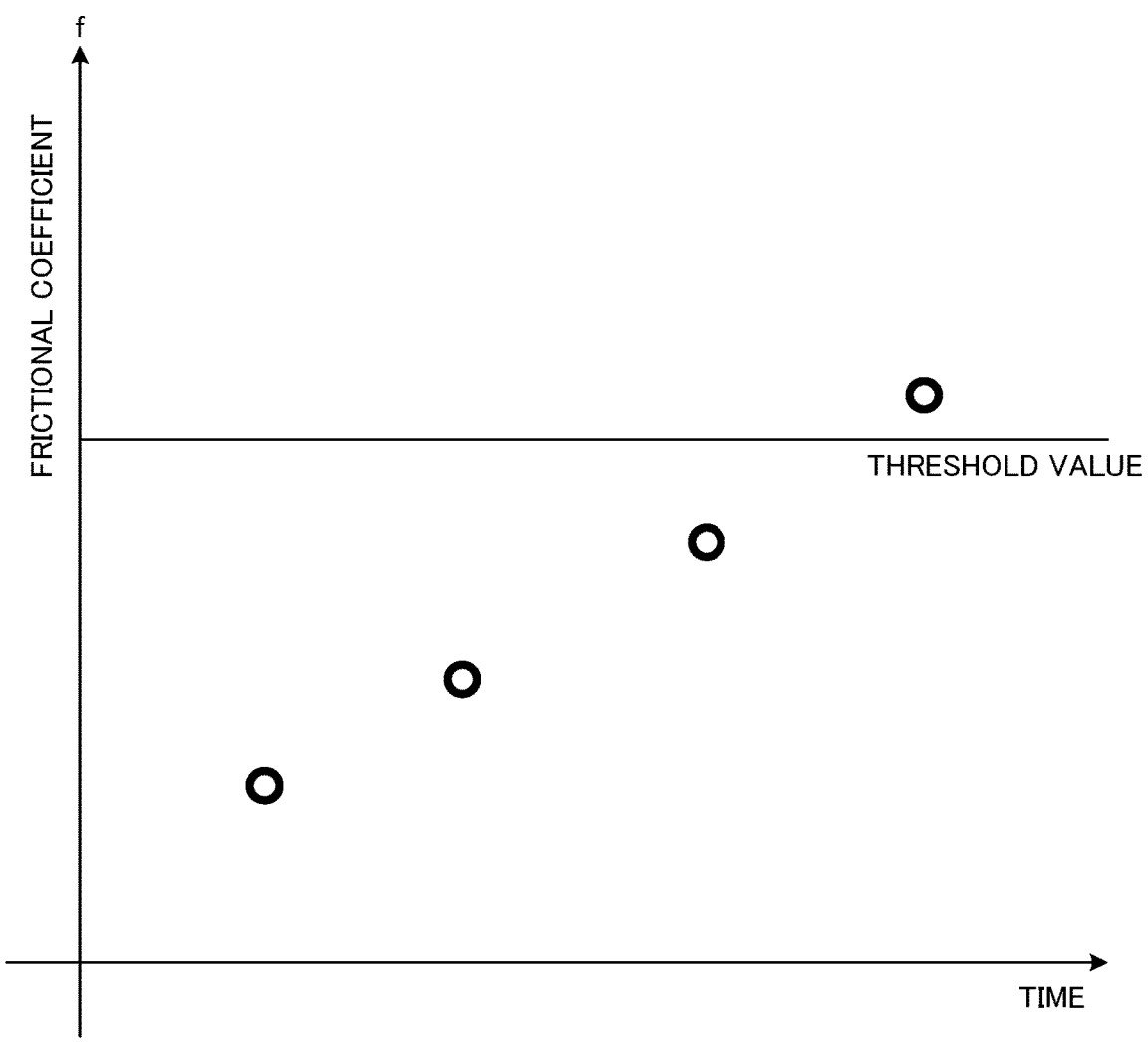
FIG. 4 is a diagram illustrating an example when an index calculated by the state analysis device according to the first example embodiment of the present invention changes.

FIG. 4 is one example of a graph illustrating a change in the frictional coefficient f when the frictional coefficient f is periodically calculated. In FIG. 4, a vertical axis denotes a size of the frictional coefficient f. Further, a horizontal axis in FIG. 4 denotes a time when a fluid pressure of the interior of the piping 801 is detected in order to calculate the frictional coefficient f. The threshold value is a threshold value for determining that the piping has deteriorated. Further, a mark indicated by a circle in FIG. 4 illustrates a value, when a pressure is detected a plurality of times, and a plurality of frictional coefficients f are calculated by the index calculation unit 110 for each of the detected pressures. The example illustrated in FIG. 4 indicates that detection is performed four times in this order from the left side in FIG. 4. Note that, when a pressure is detected a plurality of times, detected pressure information and a calculated index indicating a state of the piping are stored in the piping information storage unit 180 illustrated in FIG. 2 as necessary.

In the example illustrated in FIG. 4, it is assumed that, when a value of the frictional coefficient f exceeds the threshold value, the determination unit 120 determines that the piping is in a deteriorated state. In this case, when the mark indicated by the circle in FIG. 4 is referred to, the determination unit 120 determines that the piping is in a deteriorated state by the fourth time detection.

Further, in this example, it is assumed that the determination unit 120 determines based on an aspect of change in index. In this case, the determination unit 120 determines that deterioration of the piping has progressed, and the piping will be in a deteriorated state shortly, based on an aspect of change in value of the frictional coefficient f calculated by pressure detection that has been performed up to three times, and the threshold value.

Note that the determination unit 120 may further determine the state of the piping by using the above-described f/D, in place of the frictional coefficient f. Also, even when f/D is used in place of the frictional coefficient f, the determination unit 120 performs state analysis, based on a change in f/D, for example, similarly to a case that the frictional coefficient f is used.

Further, the determination unit 120 may use, as an index indicating a state of the piping, a flow speed of fluid of the interior of the piping 801. In other words, the determination unit 120 determines the state of the piping, based on V0 calculated by the index calculation unit 110.

When piping being an analysis target by the state analysis device 100 is piping constituting a water network, by calculating the flow speed V0, it becomes possible to know that water flows at a flow speed as assumed at the time of designing. Further, the calculated flow speed V0 is used as useful information in re-designing a piping network, drafting an operation plan of a facility installed in a piping network such as a pump, and the like. In view of the above, the determination unit 120 determines the state of the piping by comparing a flow speed that is assumed in advance with the flow speed V0. For example, when the flow speed V0 lowers below a predetermined flow speed, the determination unit 120 determines that some problem has occurred regarding a state of the piping.

Figure 5:
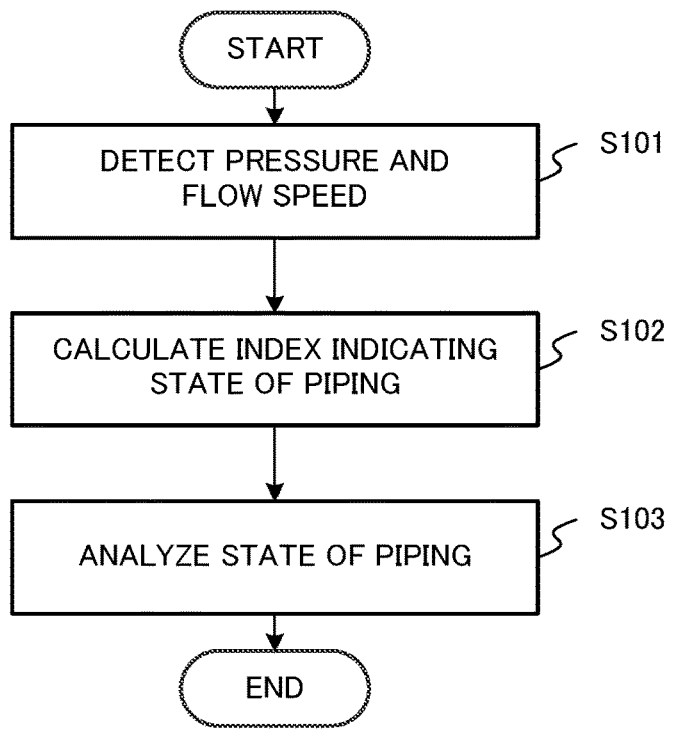
FIG. 5 is a flowchart illustrating an operation of the state analysis device according to the first example embodiment of the present invention.

Subsequently, an operation of the state analysis device 100 according to the present example embodiment is described with reference to the flowchart illustrated in FIG. 5. Note that, in this operation example, it is assumed that the state analysis device 100 is connected to two or more pressure detection units 11 and the pseudo leakage control unit 14 as illustrated in FIG. 2.

First, a fluid pressure of the interior of the piping is detected by each of the pressure detection units 11 (Step S101). In this case, a fluid pressure when fluid does not flow out of the piping, and a fluid pressure when the fluid flows out of the piping are detected. Fluid outflow is controlled by the pseudo leakage control unit 14. Further, a flow speed of the flowing-out fluid is measured by any method as necessary together with the fluid pressures. The index calculation unit 110 acquires the pressures calculated in Step S101, and a measurement value of the flow speed of the flowing-out fluid.

Subsequently, the index calculation unit 110 calculates an index relating to a state of the piping, based on the fluid pressure of the interior of the piping calculated in Step S101, and the flow speed of the fluid flowing out of the piping (Step S102). As described above, for example, the index calculation unit 110 calculates, as the index indicating the state of the piping, V0 indicating a flow speed of fluid in the piping when the fluid does not flow out of the piping, and the frictional coefficient f between an interior surface of the piping and the fluid such as water.

Subsequently, the determination unit 120 determines the state of the piping, based on the index relating to the state of the piping, which is calculated in Step S102 (Step S103). For example, the determination unit 120 determines the state of the interior of the piping, based on an index relating to the above-described frictional coefficient f or a state of another piping. The determination unit 120 may determine the state of the interior of the piping by referring to parameters stored in the piping information storage unit 180 or the like, and calculated by detecting a pressure a plurality of times.

As described above, the state analysis device 100 according to the present example embodiment calculates an index relating to a state of piping or fluid of the interior of the piping, based on a pressure or the like of the interior of the piping, which is detected by the vibration detection unit 15 or the like. Further, the state analysis device 100 determines the state of the piping. By performing such analysis, a state of the piping at a current time, or a tendency of a change in state of the piping is calculated. Therefore, the state analysis device 100 is able to determine the state of the interior of the piping with high precision.

Further, detection of a pressure or a flow speed of flowing-out fluid can be easily performed, as compared with a case that a camera is inserted into the piping, or the like. Therefore, by the state analysis device 100, it becomes possible to easily grasp a state of piping.

Second Example Embodiment

Figure 6:
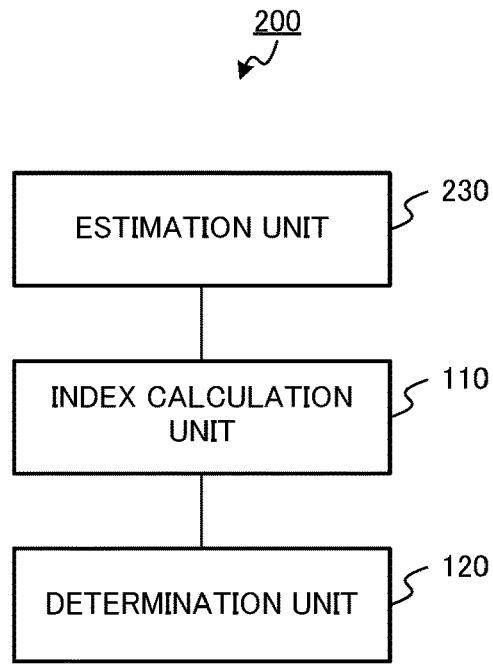
FIG. 6 is a diagram illustrating a configuration of a state analysis device according to a second example embodiment of the present invention.

Next, a second example embodiment according to the present invention is described. FIG. 6 is a diagram illustrating a state analysis device according to the second example embodiment of the present invention.

As illustrated in FIG. 6, a state analysis device 200 according to the second example embodiment includes an estimation unit 230 (one example of an estimation means), an index calculation unit 110, and a determination unit 120. The index calculation unit 110 and the determination unit 120 are elements similar to the index calculation unit 110 and the determination unit 120 included in the state analysis device 100 according to the first example embodiment. The estimation unit 230 estimates a fluid pressure of an interior of piping according to vibration detected in the piping, based on a relationship between vibration in the piping, and each of a fluid pressure of the interior of the piping and a flow speed of fluid flowing out of the piping.

Figure 7:
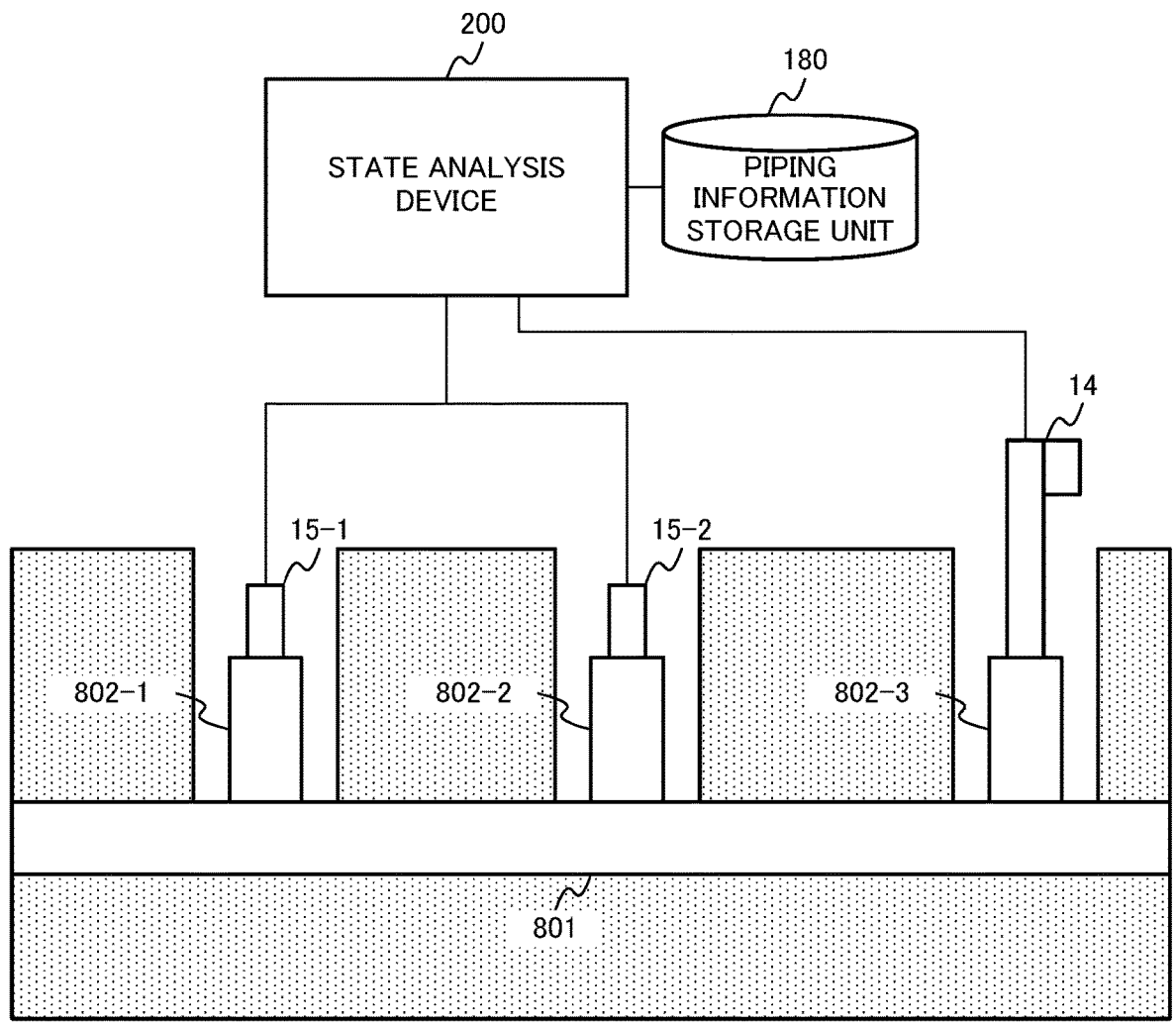
FIG. 7 is a diagram illustrating a configuration example when a state of piping of a water network is determined by the state analysis device according to the second example embodiment of the present invention.

FIG. 7 illustrates one example of a configuration of the state analysis device 200 when piping analysis is performed. The state analysis device 100 is connected to vibration detection units 15-1 and 15-2, and a pseudo leakage control unit 14. The vibration detection units 15-1 and 15-2, and the pseudo leakage control unit 14 are respectively mounted on valve stopper units 802-1 to 802-3 connected to piping 801. Each of the vibration detection units 15 is mounted on each of the valve stopper units 802 by a magnet or the like, for example. Note that, in the example illustrated in FIG. 7, the state analysis device 200 is connected to a piping information storage unit 180.

Each of the vibration detection units 15-1 and 15-2 calculates vibration data of fluid of the interior of the piping. Further, the pseudo leakage control unit 14 illustrated in FIG. 7 is an element similar to the pseudo leakage control unit 14 illustrated in FIG. 2.

Figure 8:
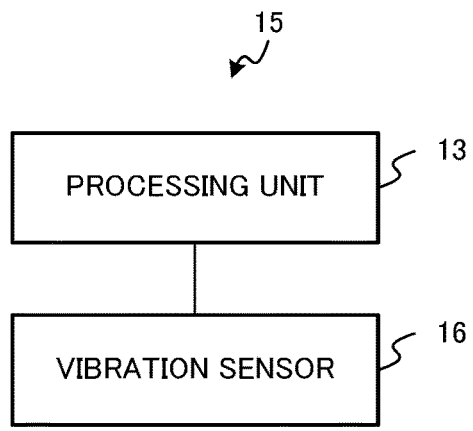
FIG. 8 is a diagram illustrating a configuration example of a vibration detection unit to be connected to the state analysis device.

FIG. 8 illustrates one example of a configuration of the vibration detection unit 15. As illustrated in FIG. 8, the vibration detection unit 15 includes a vibration sensor 16 and a processing unit 13. The vibration sensor 16 detects vibration of the interior of the piping. As the vibration sensor 16, for example, a piezoelectric acceleration sensor or a semiconductor acceleration sensor is employed. However, as the vibration sensor 16, a sensor of another type may be employed, and the type of the sensor does not matter. The vibration sensor 16 and the processing unit 13 may be configured to be accommodated in one housing, or may be configured to be respectively accommodated in individual housings, for example.

Similar to the processing unit 13 included in the pressure detection unit 11, the processing unit 13 performs processing with respect to vibration data detected by the vibration sensor 16. Specifically, the processing unit 13 is constituted by a processor for performing signal processing and the like, a memory, a communication mechanism for performing data transmission and reception, and the like. However, a specific configuration of the processing unit 13 is not specifically limited. Further, a type of processing to be performed by the processing unit 13 is not specifically limited. For example, the processing unit 13 performs data processing and the like in such a way that vibration data detected by the vibration sensor 16 have a format easily usable in each of constituent elements of the state analysis device 100.

Subsequently, each of the constituent elements of the state analysis device 200 according to the present example embodiment is described.

As described above, the estimation unit 230 estimates each of a pressure and a flow rate according to vibration detected in the piping, based on a relationship between vibration generated in the piping, and each of a fluid pressure of the interior of the piping and a flow rate. Regarding the fluid pressure, the estimation unit 230 estimates the fluid pressure of the interior of the piping at a location where vibration is detected, and its vicinity.

In the example illustrated in FIG. 7, the vibration detection units 15-1 and 15-2 are respectively provided on the valve stopper units 802-1 and 802-2 of the piping 801. Therefore, in this example, the estimation unit 230 estimates a fluid pressure in the vicinity of each of the valve stopper units 802-1 and 802-2 of the piping 801.

The estimation unit 230 estimates a fluid pressure of the interior of the piping by using a relationship, which is calculated in advance, between vibration generated in the piping, and each of a fluid pressure of the interior of the piping and a flow speed of fluid flowing out of the piping. The relationship calculated in advance is expressed as a relational expression expressing a relationship between vibration generated in the piping, and each of a fluid pressure of the interior of the piping and a flow speed of fluid flowing out of the piping. The relational expression is determined based on values measured in advance in the piping.

The relationship between vibration generated in the piping, and each of a fluid pressure of the interior of the piping and a flow rate may be expressed by a format other than the relational expression. For example, these relationships may be expressed by a format other than the relational expression, such as a table format. When a model indicating a fluid pressure of the interior of the piping is theoretically configurable, estimation may be performed by using the model. In any of the cases, a relationship between vibration generated in the piping, and each of a fluid pressure of the interior of the piping and a flow speed of fluid flowing out of the piping is stored in advance in the piping information storage unit 180, for example.

In the present example embodiment, the index calculation unit 110 calculates an index relating to a state of the piping by using a fluid pressure of the interior of the piping estimated by the above-described estimation unit 230, and a flow speed. In this case, the index relating to the state of the piping is calculated similarly to the example described in the first example embodiment. Specifically, the index calculation unit 110 calculates an index indicating a state of the piping such as the above-described frictional coefficient f and the flow speed V0, based on a flow speed of fluid flowing out of the piping and a pressure estimated by the estimation unit 230.

Further, the determination unit 120 determines the state of the piping similarly to the example described in the first example embodiment.

Figure 9:
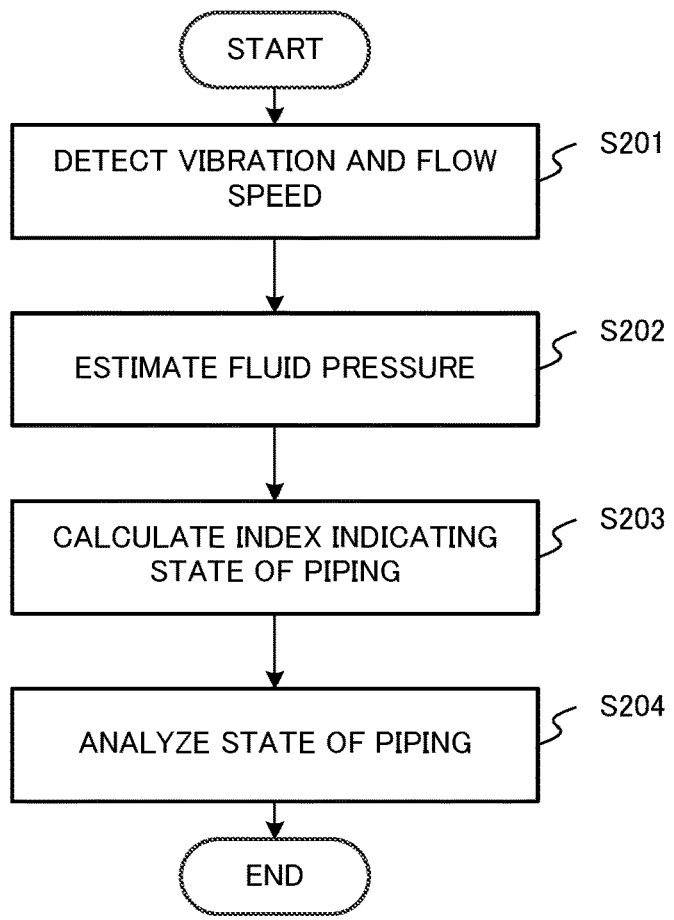
FIG. 9 is a flowchart illustrating an operation of the state analysis device according to the first example embodiment of the present invention.

Subsequently, an operation of the state analysis device 200 according to the present example embodiment is described with reference to the flowchart illustrated in FIG. 9.

First, each of the vibration detection units 15 detects vibration generated in the piping (Step S201). In this case, vibration generated in the piping when fluid does not flow out of the piping, and vibration generated in the piping when fluid flows out of the piping are detected. Fluid outflow is controlled by the pseudo leakage control unit 14. Further, a flow speed of the flowing-out fluid is measured by any method as necessary. The estimation unit 230 acquires information relating to the detected vibration.

Subsequently, the estimation unit 230 estimates a fluid pressure of the interior of the piping according to the vibration detected in Step S201, based on a relationship between vibration generated in the piping and each of the fluid pressure of the interior of the piping and the flow rate (Step S202). As described above, a relationship calculated in advance is employed, as the relationship between vibration generated in the piping, and each of the fluid pressure of the interior of the piping and the flow rate.

Subsequently, the index calculation unit 110 calculates an index relating to a state of the piping, based on the flow speed of fluid flowing out of the piping, and the fluid pressure of the interior of the piping estimated in Step S202 (Step S203).

Subsequently, the determination unit 120 determines the state of the piping, based on the index relating to the state of the piping calculated in Step S203 (Step S204). Processing of Steps S203 and S204 are respectively performed similarly to the above-described processing of Steps S102 and S103.

As described above, the state analysis device 200 according to the present example embodiment provides an advantageous effect similar to the state analysis device 100 according to the first example embodiment. Specifically, the state analysis device 200 is able to determine a state of the interior of piping with high precision.

Further, as described above, the vibration detection unit 15 is mounted on the valve stopper unit 802 of the piping 801 by a magnet or the like, for example. Specifically, the vibration detection unit 15 is mountable on piping easily and at a less cost, as compared with the pressure detection unit 11. Therefore, the state analysis device 200 allows easy state analysis on piping at a low cost.

Third Example Embodiment

Figure 10:
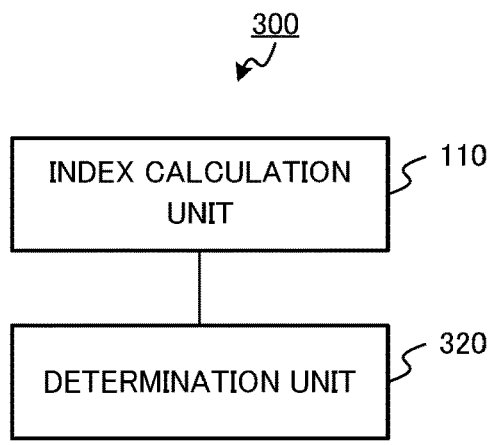
FIG. 10 is a diagram illustrating a configuration of a state analysis device according to a third example embodiment of the present invention.

Next, a third example embodiment according to the present invention is described. FIG. 10 is a diagram illustrating a state analysis device according to the third example embodiment of the present invention.

As illustrated in FIG. 10, a state analysis device 300 according to the third example embodiment includes an index calculation unit 110 and a determination unit 320. The index calculation unit 110 is an element similar to the index calculation unit 110 included in the state analysis device 100 or 200 according to the first or second example embodiment. The determination unit 320 determines a state of piping, based on an index relating to the state of the piping, and a fluid temperature of an interior of the piping.

Figure 11:
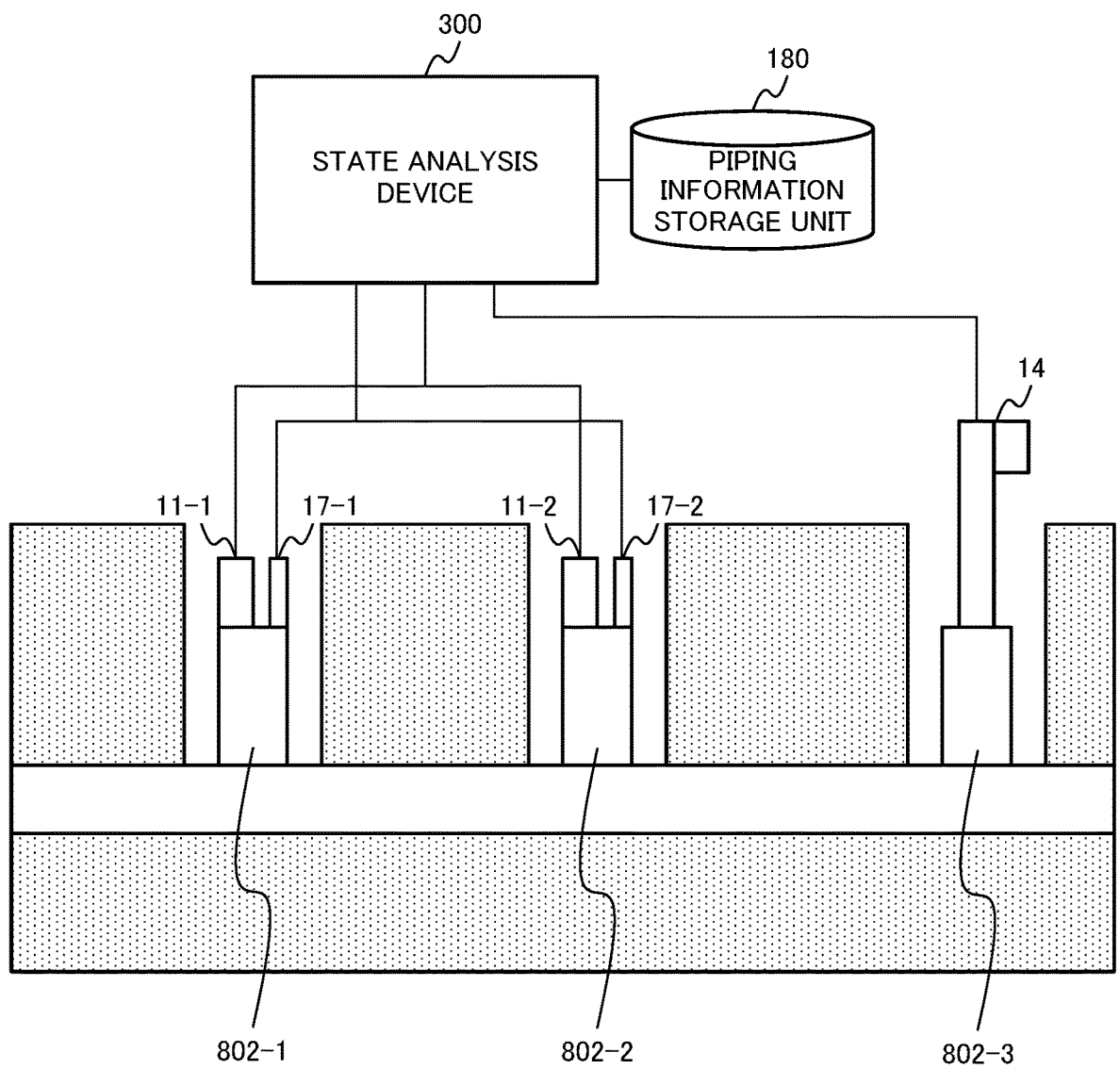
FIG. 11 is a diagram illustrating a configuration example when a state of piping of a water network is determined by the state analysis device according to the third example embodiment of the present invention.

FIG. 11 illustrates one example of a configuration of the state analysis device 300 when piping analysis is performed. The state analysis device 300 is connected to pressure detection units 11-1 and 11-2, temperature detection units 17-1 and 17-2, and a pseudo leakage control unit 14. The pressure detection units 11-1 and 11-2, and the pseudo leakage control unit 14 are respectively mounted on valve stopper units 802-1 to 802-3 connected thereto. Note that, in the example illustrated in FIG. 11, a piping information storage unit 180 is connected to the state analysis device 300.

Each of the temperature detection units 17 detects a fluid temperature of the interior of the piping. As the temperature detection unit 17, a general mechanism for detecting a temperature is employed as necessary.

Further, the temperature detection unit 17 may detect a temperature of the piping. In this case, the determination unit 320 to be described later may set the detected temperature of the piping, as a fluid temperature of the interior of the piping, or may estimate a fluid temperature of the interior of the piping, based on a relationship between a temperature of the piping and a fluid temperature of the interior of the piping, or the like.

Subsequently, each of constituent elements of the state analysis device 300 according to the present example embodiment is described.

Similarly to the example described in the first example embodiment, the index calculation unit 110 calculates an index relating to a state of piping, based on a flow speed of fluid flowing out of the piping, and a fluid pressure at a plurality of locations of the piping.

The determination unit 320 determines the state of the piping, based on the index relating to the state of the piping calculated by the index calculation unit 110, and a fluid temperature of the interior of the piping.

Generally, viscosity of fluid such as water changes when a temperature changes. Further, when water has a low temperature, the above-described frictional coefficient f tends to increase. Therefore, by considering a temperature when determining a state of piping, it may be possible to determine the state of the piping with enhanced precision.

In view of the above, the determination unit 320 determines the state of the piping, based on a fluid temperature of the interior of the piping, in addition to the index relating to the state of the piping calculated by the index calculation unit 110.

The determination unit 320 may correct a size of the frictional coefficient f, based on a relationship between a temperature and the frictional coefficient f, and determine the state of the piping, based on the corrected frictional coefficient f. When state analysis on piping is performed based on an aspect of change in index, the determination unit 320 may correct a size of a plurality of frictional coefficients f as necessary, and determine the state of the piping by reducing an influence due to a change in temperature.

Further, when state analysis on piping is performed by comparison between an index indicating a state of the piping such as the above-described frictional coefficient f, and a threshold value, the determination unit 320 may determine the state of the piping by changing the threshold value or the like according to a temperature as necessary. The determination unit 320 may also consider a fluid temperature of the interior of the piping by a procedure different from the above-described procedure.

Further, in the present example embodiment, a relationship between a temperature and the frictional coefficient f is stored in advance in the piping information storage unit 180 illustrated in FIG. 11, for example. In this case, the determination unit 320 determines the state of the piping by referring to information stored in the piping information storage unit 180 and indicating a relationship between a temperature and the frictional coefficient f, as necessary. As the relationship between a temperature and the frictional coefficient f, a relationship that is calculated theoretically in advance is employed. Alternatively, as the relationship between a temperature and the frictional coefficient f, an empirically calculated relationship may be employed.

Note that, except for a point that temperature measurement is further performed together with pressure detection, and a point that a fluid temperature is further considered when determining a state of the piping by the determination unit 320, the state analysis device 300 is operated substantially similarly to the state analysis device 100 according to the first example embodiment. Specifically, the state analysis device 300 is operated substantially along the flowchart illustrated in FIG. 5, except that an operation relating to the above-described points is performed.

As described above, the state analysis device 300 according to the present example embodiment determines a state of piping, based on a fluid pressure of the interior of the piping, in addition to a pressure of the interior of the piping, and the like. As described above, an index relating to a state of piping such as a frictional coefficient includes an index that changes according to a fluid temperature of the interior of the piping. In view of the above, by considering a temperature in a case of performing state analysis on piping, more appropriate analysis relating to the state of the piping is enabled. Therefore, the state analysis device 300 is able to determine a state of the interior of the piping with further enhanced precision, as compared with the state analysis device 100 according to the first example embodiment, and the like.

Fourth Example Embodiment

Figure 12:
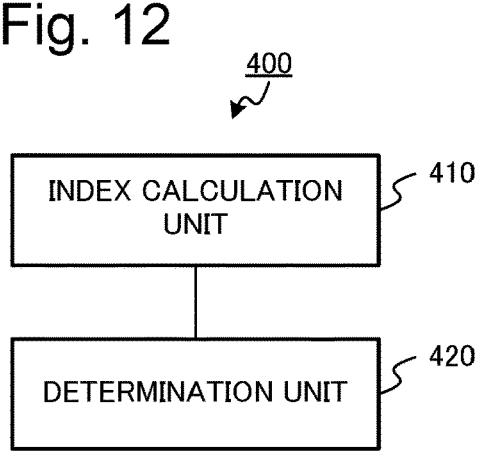
FIG. 12 is a diagram illustrating a configuration of a state analysis device according to a fourth example embodiment of the present invention.

Next, a fourth example embodiment according to the present invention is described. FIG. 12 is a diagram illustrating a state analysis device according to the fourth example embodiment of the present invention.

As illustrated in FIG. 12, a state analysis device 400 according to the fourth example embodiment includes an index calculation unit 410 and a determination unit 420. The index calculation unit 410 calculates a value associated with a state of piping, based on a flow speed of fluid flowing out of the piping, and a fluid pressure at two or more locations of different pipings among a plurality of pipings. The determination unit 420 determines the state of the piping, based on the value associated with the state of the piping.

The state analysis device described according to each of the above-described example embodiments employs one piping, as an analysis target. On the other hand, piping being an analysis target by a state analysis device is generally a part of a piping network constituted by connecting a plurality of pipings, as exemplified by a water network. In view of the above, it is desirable that the state analysis device is able to determine a state of piping efficiently for these piping networks.

A value is calculated similarly to a calculation procedure of the above-described frictional coefficient f or the flow speed V0, based on a detection result by two pressure detection units 11 provided on different pipings. It is assumed that these values are respectively f' and V0'. The calculated values f' and V0' do not indicate a frictional coefficient f and V0 themselves of either of the pipings. However, a relationship between a state of piping, and each of the values f' and V0' is similar to a relationship between a state of piping, and each of the frictional coefficient f and the flow speed V0.

In view of the above, in the present example embodiment, as one example, the state analysis device 400 calculates, as an index relating to a state of piping, a value associated with the state of the piping, based on a fluid pressure at two or more locations of different pipings. Further, the state analysis device 400 determines the state of the piping, based on a value calculated as described above. By performing as described above, it becomes possible to determine the state of the piping efficiently for a piping network.

Figure 13:
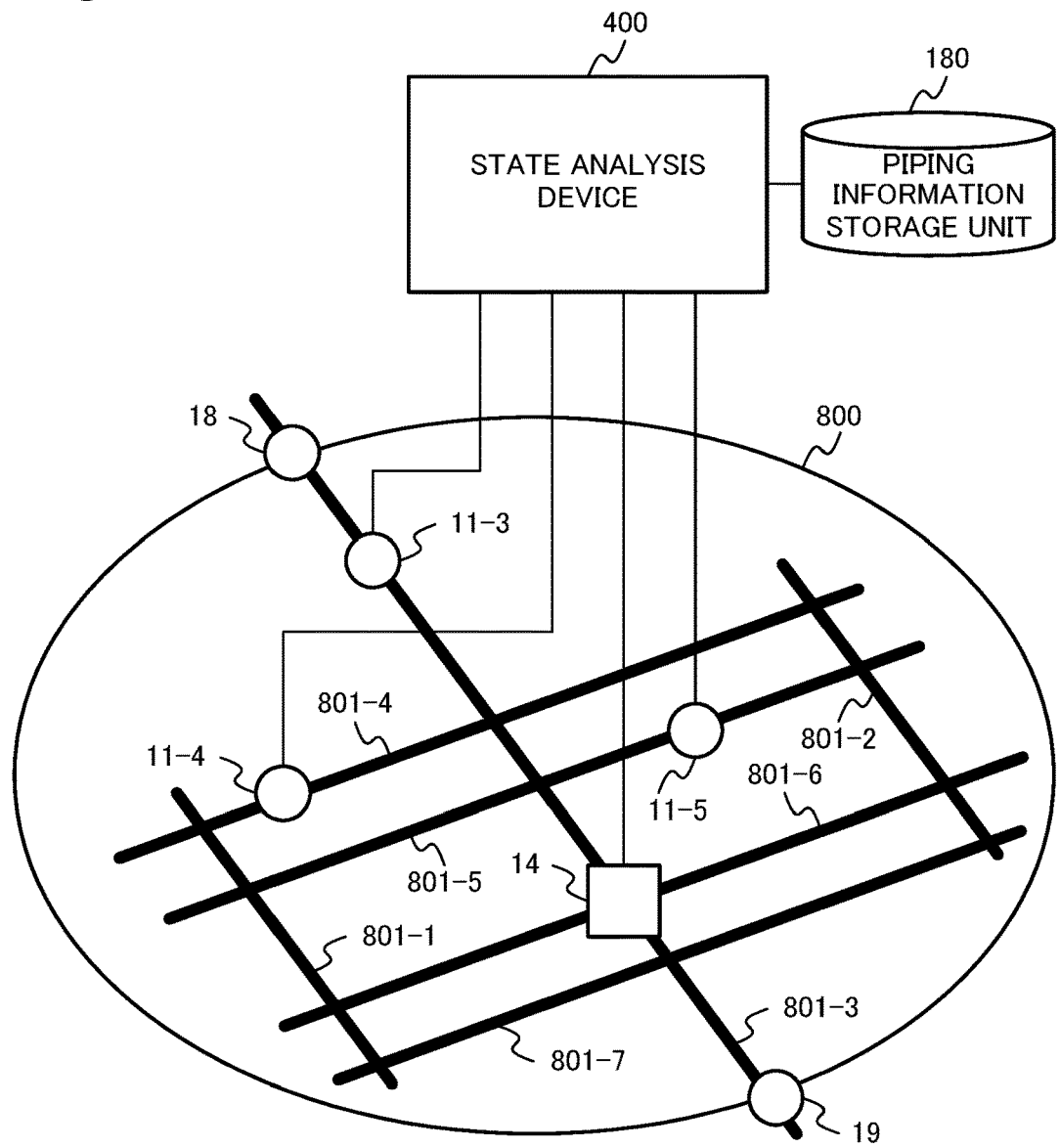
FIG. 13 is a diagram illustrating a configuration example when a state of piping of a water network is determined by the state analysis device according to the fourth example embodiment of the present invention.

FIG. 13 illustrates one example of a layout of a piping network and pressure detection units assumed in the present example embodiment. A piping network 800 is a piping network being a state analysis target by the state analysis device 400. It is assumed that the piping network 800 is a water network. The piping network 800 includes pipings 801-1 to 801-7. Further, the piping network 800 is connected to another piping network (not illustrated in FIG. 13) via an inlet valve 18 or an outlet valve 19 provided on the piping 801-3.

Further, the state analysis device 400 is connected to each of pressure detection units 11-3 to 11-5, and a pseudo leakage control unit 14. These are elements similar to the pressure detection units 11 or the pseudo leakage control unit 14 described in each of the above-described example embodiments. The pressure detection unit 11-3 is mounted on the piping 801-3, the pressure detection unit 11-4 is mounted on the piping 801-4, and the pressure detection unit 11-5 is mounted on the piping 801-5, respectively. Note that the pressure detection units 11-3 to 11-5 may be mounted on unillustrated valve stopper units or the like of the pipings 801-3 to 801-5. Further, when a pressure is detected by the pressure detection unit 11 similarly to the example of the first example embodiment, the pseudo leakage control unit 14 controls a flow rate of flowing-out fluid. Further, the state analysis device 400 determines the state of the piping, based on the fluid pressures detected by the pressure detection units 11-3 to 11-5.

Note that, when the state analysis device 400 determines the state of each of the pipings 801 included in the piping network 800, a layout of the pressure detection units 11 and the pseudo leakage control unit 14 is not limited to the example illustrated in FIG. 13. The layout of the pressure detection units 11 and the pseudo leakage control unit 14 may be determined according to a configuration of the piping network 800 as necessary. Further, the number of the pressure detection units 11 installed in the piping network 800 may be more than three. The number of the units is not specifically limited. Further, the state analysis device 400 may determine a state of piping included in a piping network by employing the piping network having a configuration different from that of the piping network 800 illustrated in FIG. 13.

Subsequently, each of constituent elements of the state analysis device 400 according to the present example embodiment is described.

As described above, the index calculation unit 410 calculates a value associated with a state of piping, based on a flow speed of fluid flowing out of the piping, and fluid pressure at two or more locations of different pipings among a plurality of pipings.

The index calculation unit 410 calculates an index similarly to the index calculation unit 110 of the state analysis device 100 according to the first example embodiment, based on the fluid pressures calculated by two or more pressure detection units provided at different pipings. In other words, the index calculation unit 410 calculates a value equivalent to the frictional coefficient f or the flow speed V0 similarly to the calculation procedure of the frictional coefficient f or the flow speed V0 by using the equations (2) to (4), based on the fluid pressures calculated by two or more pressure detection units provided on different pipings. As described above, it is assumed that these values are f' and V0', respectively.

Note that, in the example illustrated in FIG. 13, the pressure detection units 11 are provided on different pipings, respectively. In this case, the index calculation unit 410 calculates the values f' and V0', respectively as described above, regarding a pressure detected by the pressure detection unit 11-4 or 11-5 by setting a pressure detected by the pressure detection unit 11-3 as a criterion, for example.

Note that a procedure of selecting the pressure detection unit 11 when calculating the values f' and V0' is not limited to this example. The pressure detection unit 11 mounted on piping being a state analysis target may be determined as necessary.

Note that the index calculation unit 410 may calculate these indexes, based on a method different from a method in which each of the above-described equations (2) to (4) is employed. Further, the index calculation unit 410 may calculate another index different from the above-described values f' and V0'. The index calculation unit 410 may calculate a value equivalent to an index calculatable by the index calculation unit 110 by using a method usable by the index calculation unit 110 as necessary.

The determination unit 420 determines the state of the piping, based on the value associated with the state of the piping, which is calculated by the index calculation unit 110.

As described above, the value f' or V0' or the like is not a value directly indicating a state of the piping, unlike the frictional coefficient f or the flow speed V0. However, a size of a value such as the values f' and V0' changes with a tendency similar to the frictional coefficient f or the flow speed V0, according to a change in state of the piping where the pressure detection unit 11 employed when calculating these values is provided. In view of the above, the determination unit 420 determines the state of the piping, based on the value associated with the state of the piping such as f' and V0'.

The determination unit 420 determines the state of the piping by a procedure similar to that of the determination unit 120 of the state analysis device 100 according to the first example embodiment. As one example, the determination unit 420 determines the state of the piping, based on a change in value associated with the state of the piping. In this case, a state of piping is determined regarding the piping where the pressure detection unit 11 is provided.

For example, in a case of repeatedly calculating the value f', when a ratio of change in the value f' exceeds a predetermined criterion, or when a difference in size of a value regarding the value f' exceeds a predetermined criterion, or the like, the determination unit 420 determines that the state of the piping is deteriorated.

Further, when it is possible to determine a threshold value as to whether or not the piping is deteriorated regarding the value f', based on measurement values with respect to a plurality of pipings, or the like, the determination unit 420 may determine the state of the piping, based on whether or not the index f' has exceeded the threshold value.

Note that the state analysis device 400 is operated according to a procedure substantially similar to that of the state analysis device 100 according to the first example embodiment. Specifically, the state analysis device 100 is operated along the flowchart illustrated in FIG. 5, for example.

As described above, the state analysis device 400 according to the present example embodiment determines a state of piping, based on a value associated with the state of the piping. The value associated with the state of the piping is not a value directly indicating the state of the piping, unlike an index such as the above-described frictional coefficient f of the piping. However, there is a case that these values have a tendency similar to the above-described frictional coefficient f or the like with respect to a state of piping. Therefore, by determining a state of piping based on these values, the state analysis device 400 according to the present example embodiment provides a similar advantageous effect to the state analysis device 100 according to the first example embodiment.

Further, the value associated with the state of the piping is calculated, even when a plurality of pressure detection units 11 are not provided for one piping. Specifically, the state analysis device 400 is able to determine a state of piping, even when a plurality of pressure detection units 11 are not provided for one piping. Therefore, the state analysis device 400 is able to perform efficient analysis on a state of each of pipings constituting a piping network.

Note that, in a configuration according to the present example embodiment, a configuration of the state analysis device according to the second or third example embodiment as described above may be employed in combination.

Fifth Example Embodiment

Figures 14, 15:
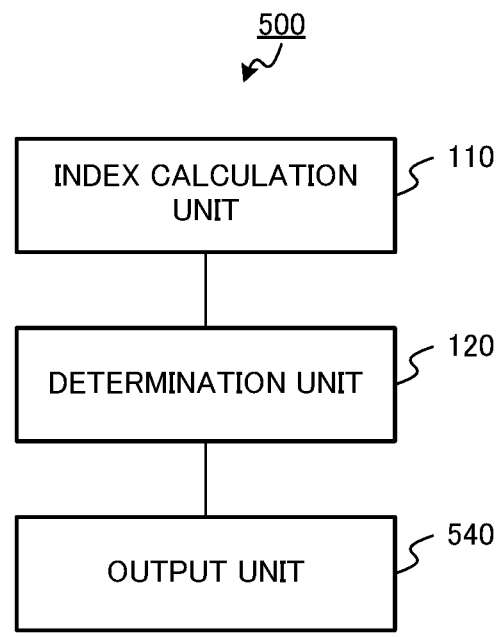
FIG. 14 is a diagram illustrating a configuration of a state analysis device according to a fifth example embodiment of the present invention.
FIG. 15 is a diagram illustrating one example of information to be output by an output unit of the state analysis device according to the fifth example embodiment of the present invention.

Next, a fifth example embodiment according to the present invention is described. FIG. 14 is a diagram illustrating a state analysis device according to the fifth example embodiment of the present invention.

As illustrated in FIG. 14, a state analysis device 500 according to the fifth example embodiment includes an index calculation unit 110, a determination unit 120, and an output unit 540 (one example of an output means). The index calculation unit 110 and the determination unit 120 are elements similar to the index calculation unit 110 and the determination unit 120 included in the state analysis device 100 according to the first example embodiment. The output unit 540 outputs an analysis result on a state of piping. Specifically, the state analysis device 500 is different from the state analysis device 100 according to the first example embodiment in that the state analysis device 500 includes the output unit 540.

Note that a configuration according to the present example embodiment may be employed in combination with a configuration of another example embodiment. In other words, an element of the above-described state analysis devices according to the second to fourth example embodiments, and the output unit 540 may be combined.

The output unit 540 outputs an analysis result on a state of piping. For example, the output result is output to a display device such as a display of an information processing device for achieving the state analysis device 500. Note that the output target is not limited to a display of a computer, and may be any other display device. The output unit 540 may output an analysis result to a display of another computer or the like via a communication network.

As one example, the output unit 540 sorts an analysis result according to a degree of a state of piping and outputs the sorted result. In this example, it is assumed that state analysis on piping is performed for a plurality of pipings by using the above-described frictional coefficient f as an index indicating the state of the piping. In this case, the output unit 540 specifies pipings of a predetermined number in which the above-described frictional coefficient f is large, and arranges and outputs the pipings in order of decreasing frictional coefficient f. In this case, piping having a higher ranking is regarded as piping to be renewed preferentially.

FIG. 15 illustrates an example of information to be output in this case. In the example illustrated in FIG. 15, "ranking" indicates a ranking when pipings are arranged in order of decreasing index. "Piping" indicates piping being a display target. In the example illustrated in FIG. 15, piping is indicated with a code for specifying the piping. "Index" indicates a value of the frictional coefficient f. By outputting such indication, it becomes possible to easily grasp piping to be renewed. Further, consequently, it becomes possible to perform renewal of piping with high cost efficiency.

When an analysis result is sorted according to a degree of a state of piping, the output unit 540 may employ another index indicating the state of the piping. Further, the output unit 540 may sort and output an analysis result by another criterion. For example, the output unit 540 may output an analysis result all at once for each type of piping, or each other criterion.

As described above, the state analysis device 500 according to the present example embodiment performs state analysis similarly to the state analysis device 100 according to the first example embodiment, and the like. Therefore, the state analysis device 500 provides a similar advantageous effect to the state analysis device 100, and the like. Further, the state analysis device 500 outputs an analysis result. The analysis result is sorted as necessary and output. Therefore, the state analysis device 500 is able to grasp a state of piping, and renew the piping with high cost efficiency.

In the foregoing, the present invention has been described with reference to the example embodiments. The present invention, however, is not limited to the above-described example embodiments. A configuration and details of the present invention may be modified in various ways comprehensible to a person skilled in the art within the scope of the present invention. Further, configurations in the example embodiments can be combined with each other as far as the combination does not depart from the scope of the present invention.

A part or all of the present invention may be described as the following supplementary notes, but are not limited to the following.

(Supplementary Note 1)

A state analysis device including:

index calculation means for calculating, based on a flow speed of fluid flowing out of piping, and a pressure of the fluid inside the piping at two or more locations of the piping, an index indicating a state of the piping; and determination means for determining the state of the piping based on the index.

(Supplementary Note 2)

The state analysis device according to supplementary note 1, wherein the index calculation means calculates the index, based on a relationship among the pressure, the flow speed, and a friction between an inner surface of the piping and the fluid.

(Supplementary Note 3)

The state analysis device according to supplementary note 1 or 2, wherein the index calculation means calculates the index, based on the pressure that changes depending on a change in the flow speed, or a change in flow rate of the fluid flowing out of the piping.

(Supplementary Note 4)

The state analysis device according to any one of supplementary notes 1 to 3, wherein the determination means determines a degree of deterioration of the piping, based on a size of the index.

(Supplementary Note 5)

The state analysis device according to any one of supplementary notes 1 to 4, wherein the determination means determines a tendency of a change in a state of the piping based on a change in the index.

(Supplementary Note 6)

The state analysis device according to any one of supplementary notes 1 to 5, wherein the determination means determines a state of the piping based on the index and a temperature of the fluid.

(Supplementary Note 7)

The state analysis device according to any one of supplementary notes 1 to 6, wherein the index calculation means calculates the index, based on the flow speed, and the pressure calculated by simulation.

(Supplementary Note 8)

The state analysis device according to any one of supplementary notes 1 to 7, further including estimation means for estimating, based on a relationship between vibration in the piping, and each of the pressure and the flow speed, the pressure according to a magnitude of the vibration.

(Supplementary Note 9)

The state analysis device according to any one of supplementary notes 1 to 8, wherein the index includes a frictional coefficient of an inner surface of the piping, and a flow speed of the fluid in the piping when the fluid does not flow out of the piping.

(Supplementary Note 10)

The state analysis device according to any one of supplementary notes 1 to 9, wherein the index calculation means calculates, based on the flow speed of the fluid, and the pressure of the fluid at each of a plurality of the pipings, a value being associated with a state of the piping or the fluid, and the determination means determines, based on the value being associated, a state of each of the plurality of the pipings.

(Supplementary Note 11)

The state analysis device according to any one of supplementary notes 1 to 10, further including output means for outputting the state of the piping being determined.

(Supplementary Note 12)

A state analysis method including:

calculating, based on a flow speed of fluid flowing out of piping, and a pressure of the fluid inside the piping at two or more locations of the piping, an index indicating a state of the piping; and determining the state of the piping based on the index.

(Supplementary Note 13)

A recording medium recording a program causing a computer to execute:

processing of calculating, based on a flow speed of fluid flowing out of piping, and a pressure of the fluid inside the piping at two or more locations of the piping, an index indicating a state of the piping; and processing of determining the state of the piping based on the index.

REFERENCE SIGNS LIST

11 Pressure detection unit
12 Pressure sensor
13 Processing unit
14 Pseudo leakage control unit
15 Vibration detection unit
16 Vibration sensor
17 Temperature detection unit
18 Inlet valve
19 Outlet valve
100, 200, 300, 400, 500 State analysis device
110, 410 Index calculation unit
120, 320, 420 Determination unit
230 Estimation unit
540 Output unit

The invention claimed is:

1. A system comprising:
a state analysis device comprising:
at least one memory storing a computer program; and
at least one processor configured to execute the computer program to:
calculate, based on a flow speed of fluid flowing out of piping, and a pressure of the fluid inside the piping at two or more locations of the piping, an index indicating a state of the piping; and
determine the state of the piping based on the index,
wherein the system further comprises:
a pseudo leakage controller connected to the state analysis device for controlling a flow rate of the fluid flowing out of the piping; and
a pressure detector connected to the state analysis device for detecting the pressure of the fluid inside the piping during a period when the flow rate of the fluid flowing out of the piping changes,
wherein the at least one processor is further configured to execute the computer program to control the pseudo leakage controller to artificially reproduce fluid leakage from the piping, and calculate the index indicating the state of the piping, based on the pressure detected by the pressure detector when the flow rate of the fluid flowing out of the piping changes.

2. The state analysis device according to claim 1, wherein the at least one processor is configured to execute the computer program to:
calculate the index, based on a relationship among the pressure, the flow speed, and a friction between an inner surface of the piping and the fluid.

3. The state analysis device according to claim 1, wherein the at least one processor is configured to execute the computer program to:
calculate the index, based on the pressure that changes depending on a change in the flow speed, or a change in flow rate of the fluid flowing out of the piping.

4. The state analysis device according to claim 1, wherein the at least one processor is configured to execute the computer program to:
determine a degree of deterioration of the piping, based on a size of the index.

5. The state analysis device according to claim 1, wherein the at least one processor is configured to execute the computer program to:
determine a tendency of a change in a state of the piping based on a change in the index.

6. The state analysis device according to claim 1, wherein the at least one processor is configured to execute the computer program to:
determine a state of the piping based on the index and a temperature of the fluid.

7. The state analysis device according to claim 1, wherein the index includes a frictional coefficient of an inner surface of the piping, and a flow speed of the fluid in the piping when the fluid does not flow out of the piping.

8. The state analysis device according to claim 1, wherein the at least one processor is configured to execute the computer program to:

calculate, based on the flow speed of the fluid, and the pressure of the fluid at each of a plurality of the pipings, a value being associated with a state of the piping or the fluid; and determine, based on the value being associated, a state of each of the plurality of the pipings.

9. The state analysis device according to claim 1, wherein the at least one processor is configured to execute the computer program to:

output the state of the piping being determined.

10. A state analysis method comprising:

calculating, based on a flow speed of fluid flowing out of piping, and a pressure of the fluid inside the piping at two or more locations of the piping, an index indicating a state of the piping;

determining the state of the piping based on the index;

controlling, by a pseudo leakage controller, a flow rate of the fluid flowing out of the piping;

detecting, by a pressure detector, the pressure of the fluid inside the piping during a period when the flow rate of the fluid flowing out of the piping changes; and controlling the pseudo leakage controller to artificially reproduce fluid leakage from the piping, and calculating the index indicating the state of the piping, based on the pressure detected by the pressure detector when the flow rate of the fluid flowing out of the piping changes.

11. A non-transitory recording medium recording a program causing a computer to execute:

calculating, based on a flow speed of fluid flowing out of piping, and a pressure of the fluid inside the piping at two or more locations of the piping, an index indicating a state of the piping;

determining the state of the piping based on the index;

controlling, by a pseudo leakage controller, a flow rate of the fluid flowing out of the piping;

detecting, by a pressure detector, the pressure of the fluid inside the piping during a period when the flow rate of the fluid flowing out of the piping changes; and controlling the pseudo leakage controller to artificially reproduce fluid leakage from the piping, and calculating the index indicating the state of the piping, based on the pressure detected by the pressure detector when the flow rate of the fluid flowing out of the piping changes.

* * * * *